UNITED STATES PATENT OFFICE.

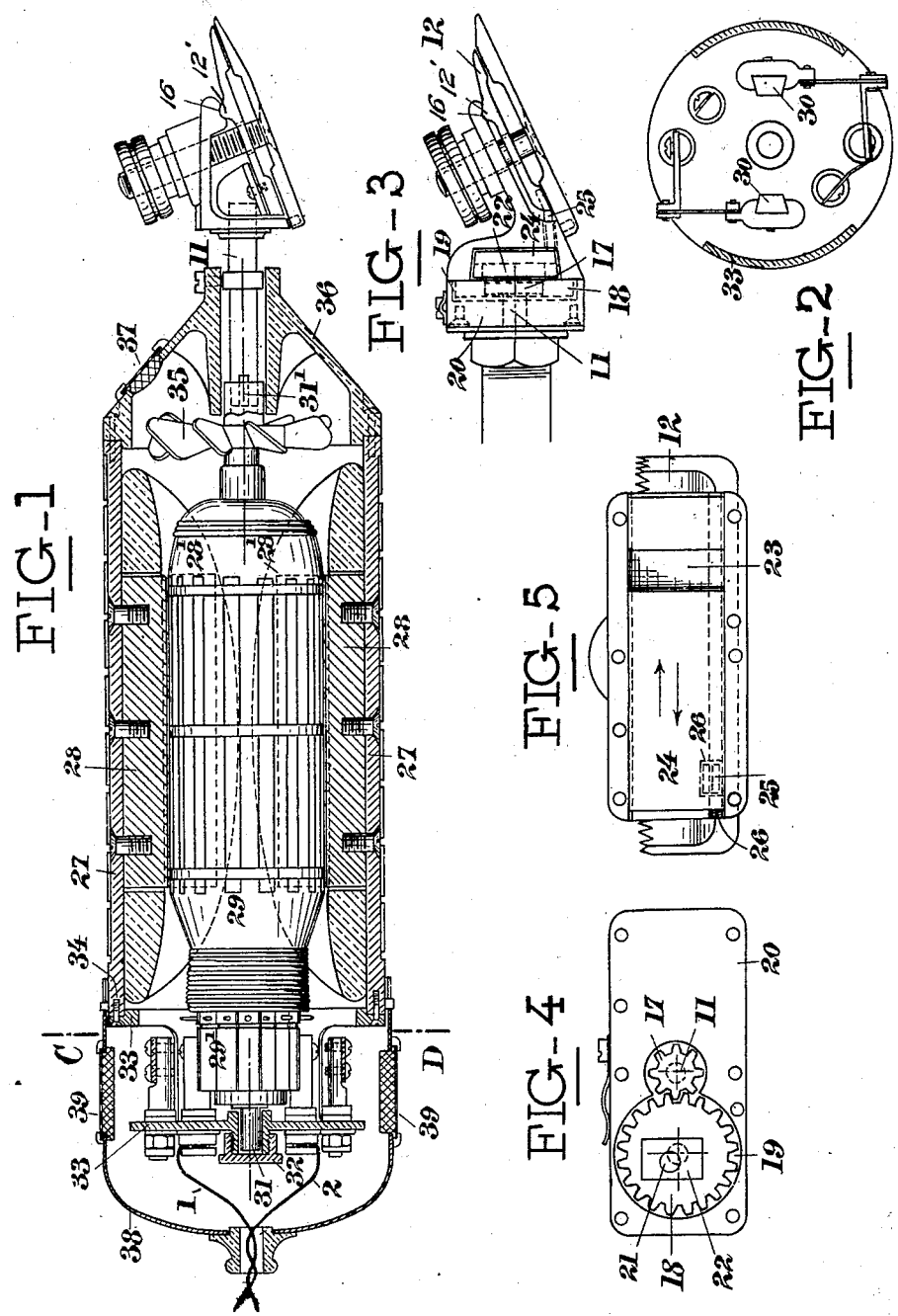

JEAN CORNU, OF LYONS, FRANCE, ASSIGNOR TO SOCIÉTÉ FRANCAISE DES TONDEUSES ÉLECTRIQUES, OF LYONS, FRANCE.

ELECTRIC CLIPPING-MACHINE.

SPECIFICATION forming part of Letters Patent No. 726,795, dated April 28, 1903.

Application filed August 4, 1902. Serial No. 118,217. (No model.)

*To all whom it may concern:*

Be it known that I, JEAN CORNU, engineer, a citizen of the Republic of Switzerland, residing at 2 Rue d'Algérie, Lyons, in the Republic of France, have invented a certain new and Improved Electric Clipping-Machine, of which the following is a specification.

This invention relates to an electric clipping-machine which is essentially characterized by the direct coupling of an electric motor with the clipping-blade.

My improved electric clipping-machine may be constructed in a variety of different forms and manners.

In the accompanying drawings a constructional form of the device based upon this novel method of direct coupling is illustrated.

Figures 1 and 2 are respectively a longitudinal section and a cross-section on the line C D of a form of the device. Fig. 3 is a sectional view of a modified method of arranging and operating the movable clipping-blade, and Figs. 4 and 5 are detail views showing the special means for actuating this movable blade.

This system of electric clipper consists, as indicated above, of two parts connected one with the other—the "motor" and the "clipper," properly so called—the motor being supplied with the electric current either by means of batteries, accumulators, or electric-supply mains through the positive and negative wires 1 and 2.

As shown in the drawings, a continuous-current motor is provided for actuating the clipper; but such continuous-current motor may be replaced by an alternating current, a bi or tri phase, or other suitable motor, the tension of which varying according to the size—for example, between sixty-five and one hundred and ten volts.

The motor of the clipping-machine shown in Fig. 1 consists of a metal cylinder 27, (which may be of soft steel or cast-iron, for example,) in which are arranged two polar pieces 28 28, terminating in shoulders 28', between which are situated the field-magnet coils. The armature 29 consists of exceedingly thin strips of iron magnetically insulated one from the other by means of very thin sheets of paper. These blades are stamped with teeth, between which is wound the wire which terminates at a collector 29', of hard copper. Special carbon-brushes 30 (see Fig. 2) receive the current from the source of electric energy. The shaft 31 of the armature of the motor terminates at the rear or collector side in a nut, pressing the collector upon the metal strips, its extremity resting in a bearing constituted by a bored plug 32, screwed upon a stirrup 33, fixed to the cylinder 27 by screws 34, which stirrup carries also the brush or carbon holders 30. At the other extremity of the armature-shaft is mounted a fan 35, which is provided for cooling the blades of the clipper, driving off the hair, and cooling the motor. The extremity of the shaft 31' is recessed, and this recess is provided with a transverse groove for the reception of the shaft 11 of the eccentric driving the movable blade of the clipper. At the front extremity of the cylinder 27 is fixed, by means of screws, a metal cone 36, the turned and recessed portion of which forms the bearing for the motor. Apertures 37, covered with metal gauze, which are arranged around the periphery of this cone, permit the air to reach the interior of the motor from outside. Finally, a cap 38 incloses the motor at its rear portion and protects the brushes and brush-holders. Apertures 39, furnished with metallic gauze, are provided around its periphery to prevent heating. In this form of clipper the movable blade 12 is guided in its transverse movement by a longitudinal rib 12', formed at its upper portion and which slides in a corresponding groove 16, formed beneath along the entire width of the blade-holder of the clipper. The same method of guiding is adopted in the form of the machine represented in Fig. 3; but here the manner of actuating the movable blade instead of being by means of an ordinary cam, as in Fig. 1, is effected by a special eccentric movement, so as to permit of the addition in this form of machine of means for reducing the velocity of the motor. This speed reduction is effected (see Figs. 4 and 5) by means of a train of gear-wheels, consisting of a pinion 17, mounted upon the central spindle 11 of the motor and meshing with a gear-wheel 18. This pinion and gear-wheel are lodged in a recess 19, formed in the thickness of the blade-holder 20.

The eccentric movement above referred to is imparted to the clipper-blade in the following manner: Upon an eccentric spindle 21, attached to the wheel 18, is mounted loosely a rectangular part 22, capable of vertical displacement in a recess 23, formed in a slide-block 24, which latter carries at its front extremity a hook 25, engaging in a notch 26, formed in the rear portion of the movable blade 12, and thus causes this blade to participate in the movement of the slide-block.

This system of electric clipping-machine, as indicated above, may be constructed in a variety of manners and dispositions, according to the form of the motor and the place where it will be disposed—for example, to the opposite extremity of the clipping-blade—the intermediate central part forming in this case handle, &c.

What I claim, and desire to secure by Letters Patent of the United States, is—

1. In an electric clipping-machine, a casing, an electric motor therein, a cutting-blade coupled directly to said motor and a fan within said casing interposed between the motor and the cutting-blade.

2. In an electric clipping-machine, a casing, an electric motor therein, a cutting-blade coupled directly to said motor, a fan within said casing interposed between the motor and the cutting-blade, and a conical end of said casing forming a bearing for the cutter-shaft and provided with perforations.

3. In an electric clipping-machine, a casing, an electric motor mounted therein, a cone at one end of said casing forming a bearing for the motor-shaft, a cutting-blade-operating shaft mounted in said cone and coupled to the motor-shaft, a cutting-blade operatively connected with the first-mentioned shaft, a fan interposed between said cone and the adjacent end of the motor, a support for the opposite end of the motor-shaft and carbon-holders mounted on said support.

4. In an electric clipping-machine, a casing, an electric motor therein, a cutting-blade coupled directly to said motor, a fan within said casing interposed between the motor and the cutting-blade, a conical end of said casing forming a bearing for the cutter-shaft and provided with perforations, and an eccentric and train of gears for reducing the velocity of the motor.

5. In an electric clipping-machine, a casing, an electric motor therein, a cutting-blade, an eccentric spindle, a gear-wheel carrying the same, a slide-block operatively connected with said spindle and a detachable connection between said block and the cutting-blade.

In testimony whereof I have hereunto set my hand, in presence of two subscribing witnesses, this 7th day of July, 1902.

JEAN CORNU.

Witnesses:
   JEAN GERMAIN,
   FRANCIS GULLIET.